United States Patent [19]

Gerritsen

[11] Patent Number: 4,481,476
[45] Date of Patent: Nov. 6, 1984

[54] PICTURE DISPLAY DEVICE COMPRISING A PICTURE DISPLAY TUBE AND A CIRCUIT FOR FEEDING THE HEATER THEREOF

[75] Inventor: Jan Gerritsen, Eindhoven, Netherlands

[73] Assignee: U.S. Philips Corporation, New York, N.Y.

[21] Appl. No.: 304,399

[22] Filed: Sep. 21, 1981

[30] Foreign Application Priority Data

Oct. 14, 1980 [NL] Netherlands .................... 8005651

[51] Int. Cl.$^3$ .......................................... H01F 13/00
[52] U.S. Cl. .................................... 328/270; 315/94; 315/106
[58] Field of Search ................... 328/270; 315/306, 3, 315/48, 94

[56] References Cited

U.S. PATENT DOCUMENTS 3,798,369  3/1974  Dietch .............................. 328/270
3,886,401  5/1975  Berg .................................. 315/94
3,982,153  9/1976  Burdick et al. .................... 328/270

*Primary Examiner*—John S. Heyman
*Assistant Examiner*—Timothy P. Callahan
*Attorney, Agent, or Firm*—Thomas A. Briody; William J. Streeter; Edward W. Goodman

[57] ABSTRACT

A picture display device including a picture display tube and a circuit for supplying the heater thereof with an increased heater voltage during a predetermined warming up period. The heater is connected to the secondary winding of an (auto) transformer, the primary winding of which is connected to a terminal of an a.c. voltage source, for example a winding provided on a line output transformer, the other ends of the primary and the secondary windings being interconnected and connected to a positive temperature coefficient thermistor and the other ends of the heater and the thermistor being connected to the other terminal of the source. The secondary winding has more turns than the primary winding.

5 Claims, 3 Drawing Figures

PICTURE DISPLAY DEVICE COMPRISING A PICTURE DISPLAY TUBE AND A CIRCUIT FOR FEEDING THE HEATER THEREOF

BACKGROUND OF THE INVENTION

The invention relates to a picture display device comprising a picture display tube and a circuit for feeding the heater thereof having a first and a second terminal for connection to an a.c. voltage source, and circuit means whereby the voltage across the heater assumes, at switch-on of the picture display device, a value which is higher than the nominal value and assumes substantially the nominal value after a predetermined warm-up period, these means comprising a positive temperature coefficient thermistor.

Such a circuit with which warming up of the cathode(s) of a picture display tube is accelerated is disclosed in U.S. Pat. No. 3,886,401. In this prior art circuit the heater is connected after a few seconds to the nominal voltage, i.e. the voltage specified by the tube manufacturer as being the average heater voltage in normal operation, and is heated. For this the voltage of the a.c. voltage source is applied to the heater via a resistor. In parallel with the resistor there is a positive temperature coefficient thermistor which is kept warm and, consequently, highly resistive by means of a second positive temperature coefficient thermistor connected between the terminals.

When the picture display device is switched on, the two thermistors are of low resistance so that the voltage across the heater is higher than in the steady state. In practice, the circuit does not operate satisfactorily when the second thermistor is omitted. In the cold state, the first thermistor must have a very low resistance and, consequently, requires a high current to warm up. As the heater also behaves as a positive temperature coefficient thermistor, the resistance variation of which is, in addition, much faster than that of the first thermistor, the final temperature of this heater must be rather high. This is achieved by means of the second thermistor. This results in that much power is dissipated, particularly by the second thermistor which is connected directly to the voltage from the source. In addition, such a double thermistor is an expensive component.

SUMMARY OF THE INVENTION

The invention has for its object to provide a picture display device having a supply circuit by means of which the heater voltage is initially temporarily increased, which is cheaper than the prior art circuit and which dissipates less power. According to the invention, the picture display device is characterized in that one terminal of the heater is connected to one end of the secondary winding of a transformer one end of the primary winding of which is connected to the first terminal, the other ends of the primary and the secondary windings being interconnected and connected to one terminal of the thermistor, the other terminals of the heater and the thermistor being connected to the second terminal and the secondary winding of the transformer having more turns than the primary winding.

The picture display device of the invention may be characterized in that the transformer is in the form of an auto-transformer having a winding and a tap, the entire winding forming the secondary winding while a portion of the winding between one end thereof and the tap forms the primary winding, this end being connected to the thermistor while the tap is connected to the first terminal.

Preferably, the picture display device of the invention is characterized in that the magnetic coupling between the primary and the secondary winding is such that the polarity of the voltage across the heater is the same during the warming up period as well as thereafter, and is also characterized in that the a.c. voltage source consists of a winding provided on a line output transformer.

BRIEF DESCRIPTION OF THE DRAWING

The invention will now be further described with reference to the accompanying drawing, in which.

DESCRIPTION OF THE PREFERRED EMBODIMENTS

Figure 1:
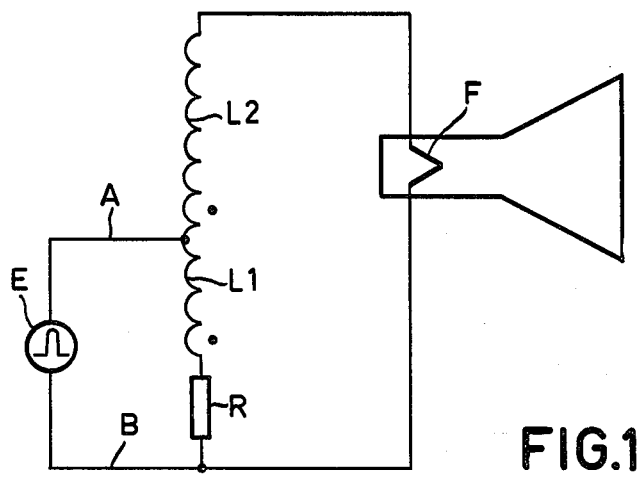
FIG. 1 shows a supply circuit for feeding the heater of a picture display tube in a picture display device of the invention.

Referring to FIG. 1, there is shown in a picture display device, for example a television receiver, only the supply circuit for the heater F of a picture display tube. In some types of picture tubes, the cathode is heated directly so that the cathode is usually brought rather quickly up to its operating temperature. Color television tubes include three heaters which, when heated indirectly, are internally connected in parallel or in series, the combination thus formed substituting heater F in FIG. 1. In the event the heaters are separated the circuit of the type shown in FIG. 1 can be used three-fold.

The circuit of FIG. 1 comprises a coil having a tap which form two magnetically coupled inductances L1 and L2. Inductance L1 is arranged in series with a resistor R while inductance L2 is arranged in series with heater F. The tap forms a terminal A. That terminal of resistor R which is not connected to inductance L1 and that terminal of heater F which is not connected to inductance L2 are interconnected, forming a terminal B. Terminals A and B are connected to an a.c. voltage source E. Source E may be a secondary winding of a transformer which is connectable to a line voltage. In the present example, source E consists of a secondary winding provided on a line output transformer, line flyback pulses being present across this winding during operation. Feeding the circuit with pulses of the line frequency has the advantage that the inductances have low values owing to the comparatively high frequency, while another advantage is the fact that in most cases, line flyback pulses have a substantially constant amplitude.

Resistor R is a positive temperature coefficient thermistor. When the receiver is switched on, thermistor R is cold and consequently has a low resistance value. After some tenths of a second, the line deflection circuit is operative and line flyback pulses are present between terminals A and B. Inductances L1 and L2 form an auto-transformer whereby the pulses of source E are stepped up. In response thereto, the rms heater voltage $V_f$ increases gradually, which is a positive effect in the prevention of damage to the heater. The circuit is rated so that voltage $V_f$ becomes higher after some tenths of a second, for example approximately 10 V rms, than the nominal value which is, for example, 6.3 V rms. This reduces the warm-up period of the cathode(s) which are heated by heater F. During this time period, the several circuits of the receiver can stabilize. When the warm-up time is not shortened, a picture of a normal brightness appears on the picture screen of the picture tube 8 to 9 seconds after turn-on of the receiver. The circuit of FIG. 1 accomplishes this already after 4 seconds.

Figure 2:
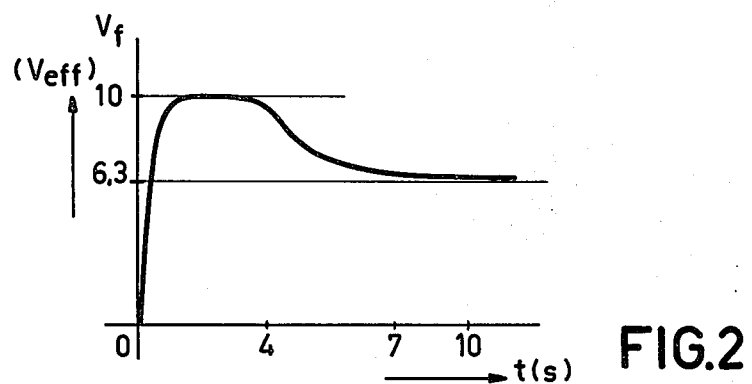
FIG. 2 shows the variation of the heater voltage as a function of the time in the circuit of FIG. 1.

As long as the thermistor R is still cold and consequently of a low resistance, stepped up line pulses are applied to heater F and the voltage $V_f$ remains approximately equal to 10 V (see FIG. 2). However, the current flowing through inductance $L_1$ and thermistor R warms the thermistor. After 3 to 4 seconds the thermistor has reached such a temperature that its resistance value has become comparatively high. A small current now flows through the thermistor so that the thermistor maintains a high temperature. The connection between inductance L1 and terminal B is as it were interrupted. As the amplitude of the pulses from source E for each winding of the line output transformer amounts already to some Volts (rms) and is, consequently, stepped up in steps which are too coarse with respect to the nominal voltage of $V_f$, the voltage from source E is decreased by means of the series inductance L2. FIG. 2 shows that voltage $V_f$ decreases gradually after approximately 3 to 4 seconds and that it reaches the final value of 6.3 V between approximately 7 to 10 seconds after the receiver has been turned on.

Figure 3:
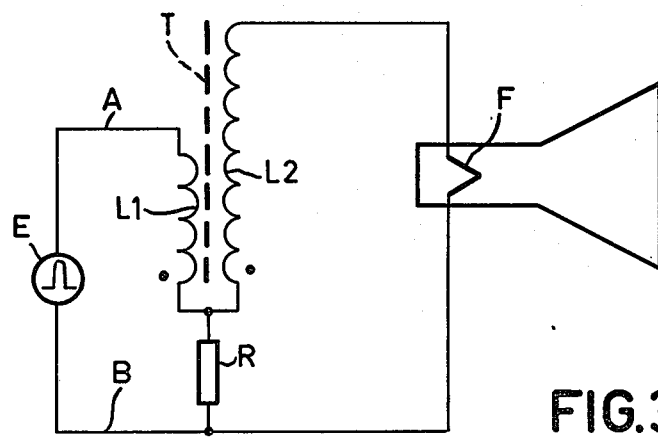
FIG. 3 shows a variant of the circuit of FIG. 1.

The supply circuit may alternatively be of the construction shown in FIG. 3. Herein T denotes a transformer, a primary winding of which is connected between terminal A and thermistor R and which consequently has the same function as inductance L1 in FIG. 1. The secondary winding of transformer T is connected between heater F and thermistor R and has therefore the same function as the entire winding L1+L2 in FIG. 1.

The winding sense of the windings is important, both for FIG. 1 and FIG. 3. The inductances L1 and L2 must preferably be coupled such that the lines of force generated thereby must be of opposite directions, which is indicated in FIGS. 1 and 3 by means of polarity dots. The polarity of voltage $V_f$ in the cold state of thermistor R is then equal to the polarity in the warm state. From calculation, it appears that for the other case the rating is much more critical.

In practice the magnetic coupling k between inductances L1 and L2 and between the similar windings of transformer T, respectively, is so loose that they can be in the form of an air coil. The choice of the inductance values of L1 and L2, of coupling k and of the properties at line frequency of thermistor R makes it possible, at a given amplitude of the pulses from source E, to satisfy, within certain limits, the three requirements imposed, namely, the value of the increased heater voltage, the final value thereof and the warming up period of the cathode(s) heated by heater F. Good results were obtained with the circuit of FIG. 1 when the following values were opted for:

source E: amplitude 28.5 V with an inductive internal impedance corresponding to 2 μH
inductance value of L1: 6.6 μH
inductance value of L2: 22 μH
coupling k=0.51
thermistor R: at 25° C., R≈0.5Ω at 150° C., R>40Ω
dissipation factor: 27 mW/°C.
heat capacity: 1.2 J/°C.

When this circuit is used, thermistor R requires approximately 4 seconds to get warm and the current therethrough has the rms value required therefor of approximately 5.4 A. The initial value of the current through heater F is approximately 2 A rms, which is the maximum permissible value, while the final value thereof is 700 mA. It is obvious that in a direct series arrangement of the thermistor with the heater, that is to say without series inductance, an initial current having a value of 5.4 A cannot be achieved. It has been found that spreads in the values of thermistor R do not have any substantial influence on the heater voltage, neither in the cold nor in the hot state. This heater voltage is determined almost exclusively by the a.c. voltage source and by the coil L1, L2. It has also been found that the parasitic capacitance of the thermistor, which cannot be ignored at the line frequency, does not negatively affect the operation of the circuit and neither does the fact that the resistance value of the thermistor in the final state varies somewhat in dependence on the instantaneous pulse voltage. So the thermistor is not critical and the circuit is easily reproduceable.

In addition, the circuit is reliable. When the thermistor becomes defective it forms an open circuit. It has been found that a complete break-down of the thermistor produces, in the final state, only a change of 0.2 V in the heater voltage. It is obvious that then no accelerated heating of the heater occurs. In contrast therewith, a mechanical switch, if provided in the position of the thermistor, may go on conducting, thereby considerably shortening the operating life of the picture tube. This also holds for an alternative possibility, namely when a rectifier with a time-constant network is used as the switch. Finally, it should be noted that keeping the thermistor warm produces a slight dissipation in the final state. The above-specified values result in a dissipation of (140-20)×0,027=3.2 W at an ambient temperature of 20° C. and a final temperature of 140° C. Said dissipation can be still further reduced by means of a thermistor which is specially adapted for this purpose.

What is claimed is:

1. A picture display device comprising a picture display tube and a circuit for feeding the heater thereof having a first and a second circuit terminal for connection to an a.c. voltage source, and circuit means whereby the voltage across the heater assumes, at switch-on of the picture display device, a value which is higher than the nominal value and assumes substantially the nominal value after a predetermined warming up period, these means comprising a positive temperature coefficient thermistor, characterized in that one terminal of the heater is connected to one end of a secondary winding of a transformer, one end of a primary winding of which is connected to the first circuit terminal, the other ends of the primary and the secondary windings being interconnected and connected to one terminal of the thermistor, the other terminals of the heater, the thermistor being interconnected and connected to the second circuit terminal and the secondary winding of the transformer having more turns than the primary winding.

2. A picture display device as claimed in claim 1, characterized in that the transformer is in the form of an auto-transformer having a winding and a tap, the entire winding forming the secondary winding while a portion of the winding between one end thereof and the tap forms the primary winding, this end being connected to the thermistor while the tap is connected to the first terminal.

3. A picture display device as claimed in claim 1 or 2, characterized in that the magnetic coupling between the primary and the secondary winding is such that the polarity of the voltage across the heater is the same both during the warming up period as well as thereafter.

4. A picture display device as claimed in claim 1 or 2, characterized in that the a.c. voltage source consists of a winding provided on a line output transformer.

5. A picture display device as claimed in claim 3, characterized in that the a.c. voltage source consists of a winding provided on a line output transformer.

* * * * *